United States Patent
Ward et al.

(10) Patent No.: US 8,513,588 B2
(45) Date of Patent: *Aug. 20, 2013

(54) ELECTRONIC CAMERA HAVING MULTIPLE SENSORS FOR CAPTURING HIGH DYNAMIC RANGE IMAGES AND RELATED METHODS

(75) Inventors: Gregory John Ward, Berkeley, CA (US); Helge Seetzen, Vancouver (CA); Wolfgang Heidrich, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,597

(22) Filed: Aug. 13, 2012

(65) Prior Publication Data
US 2012/0307114 A1 Dec. 6, 2012

Related U.S. Application Data

(63) Continuation of application No. 11/609,837, filed on Dec. 12, 2006, now Pat. No. 8,242,426.

(51) Int. Cl.
*H01L 27/00* (2006.01)
*H01J 40/14* (2006.01)

(52) U.S. Cl.
USPC .................................. 250/208.1; 250/214 R

(58) Field of Classification Search
USPC ....... 250/208.1, 216, 214 R, 214.1; 348/272, 348/281, 282, 294, 296, 302; 257/414, 431, 257/443, 451
See application file for complete search history.

(56) References Cited

U.S. PATENT DOCUMENTS

| | | | |
|---|---|---|---|
| 4,652,909 A | 3/1987 | Glenn | |
| 5,420,635 A | 5/1995 | Konishi et al. | |
| 5,638,119 A | 6/1997 | Cornuejols | |
| 5,801,773 A | 9/1998 | Ikeda | |
| 6,198,505 B1 | 3/2001 | Turner et al. | |
| 6,204,881 B1 | 3/2001 | Ikeda et al. | |
| 6,542,698 B2 | 4/2003 | Izawa | |
| 6,593,970 B1 | 7/2003 | Serizawa et al. | |
| 6,718,010 B2 | 4/2004 | Petrick et al. | |
| 6,788,338 B1 | 9/2004 | Dinev et al. | |
| 6,864,916 B1 | 3/2005 | Nayar | |
| 7,030,358 B2 | 4/2006 | Misawa | |
| 7,084,905 B1 | 8/2006 | Nayar et al. | |
| 7,319,423 B2 | 1/2008 | Augusto et al. | |

(Continued)

FOREIGN PATENT DOCUMENTS

| | | |
|---|---|---|
| JP | 2001-136434 A | 5/2001 |
| JP | 2002-290822 A | 10/2002 |

(Continued)

*Primary Examiner* — Pascal M Bui Pho

(57) ABSTRACT

An electronic camera comprises two or more image sensor arrays. At least one of the image sensor arrays has a high dynamic range. The camera also comprises a shutter for selectively allowing light to reach the two or more image sensor arrays, readout circuitry for selectively reading out pixel data from the image sensor arrays, and, a controller configured to control the shutter and the readout circuitry. The controller comprises a processor and a memory having computer-readable code embodied therein which, when executed by the processor, causes the controller to open the shutter for an image capture period to allow the two or more image sensor arrays to capture pixel data, and, read out pixel data from the two or more image sensor arrays.

19 Claims, 3 Drawing Sheets

(56) References Cited

U.S. PATENT DOCUMENTS

| | | |
|---|---|---|
| 7,612,822 B2 * | 11/2009 | Ajito et al. ............... 348/336 |
| 8,242,426 B2 * | 8/2012 | Ward et al. ............... 250/208.1 |
| 2001/0007473 A1 * | 7/2001 | Chuang et al. ............ 348/362 |
| 2002/0097997 A1 | 7/2002 | Izawa |
| 2004/0013319 A1 * | 1/2004 | Wenstrand et al. ........ 382/299 |
| 2004/0165091 A1 | 8/2004 | Takemura et al. |
| 2005/0275747 A1 | 12/2005 | Nayar et al. |
| 2006/0158462 A1 | 7/2006 | Toyama et al. |
| 2006/0209204 A1 | 9/2006 | Ward |
| 2006/0221209 A1 | 10/2006 | McGuire et al. |
| 2007/0257184 A1 | 11/2007 | Olsen et al. |

FOREIGN PATENT DOCUMENTS

| | | |
|---|---|---|
| JP | 2003-101886 A | 4/2003 |
| JP | 2004-014802 A | 1/2004 |
| JP | 2004-274578 A | 9/2004 |
| JP | 2004-328530 A | 11/2004 |
| JP | 2005-12734 A | 1/2005 |
| JP | 2006-238163 A | 9/2006 |
| WO | 02069030 A2 | 9/2002 |
| WO | 2005104035 A1 | 11/2005 |
| WO | 2006036668 A2 | 4/2006 |

* cited by examiner

ELECTRONIC CAMERA HAVING MULTIPLE SENSORS FOR CAPTURING HIGH DYNAMIC RANGE IMAGES AND RELATED METHODS

CROSS-REFERENCE TO RELATED APPLICATIONS

This application is a continuation of U.S. patent application Ser. No. 11/609837 filed on 12 Dec. 2006 and entitled ELECTRONIC CAMERA HAVING MULTIPLE SENSORS FOR CAPTURING HIGH DYNAMIC RANGE IMAGES AND RELATED METHODS which is hereby incorporated herein by reference for all purposes.

TECHNICAL FIELD

The invention relates to electronic cameras, and particularly to methods and electronic camera apparatus for capturing multiple exposures. The invention has application in capturing high dynamic range images.

BACKGROUND

Real world scenes can have contrast ratios of 50,000:1 between the brightness of the brightest highlights and the darkest shadows. Many conventional image formats and image rendering devices (such as digital projectors, computer monitors, and the like) are only capable of reproducing contrast ratios of a few hundred to one. In such file formats it is not uncommon for pixel brightness values to be specified using one 8-bit number per colour.

High dynamic range ("HDR") image formats permit recording contrast ratios that are significantly greater than those of conventional 8-bit image formats. For example, some HDR formats use 16 or 32 bits per colour to represent different levels of brightness.

One way to obtain image data for high dynamic range images is to acquire multiple images with conventional imaging equipment at different exposure levels. This technique is described, for example, in Debevec et al. *Recovering High Dynamic Range Radiance Maps from Photographs*, Proceedings of SIGGRAPH 97, Computer Graphics Proceedings, Annual Conference Series, pp. 369-378 (August 1997, Los Angeles, Calif.), Addison Wesley, Edited by Turner Whitted. ISBN 0-89791-896-7, which is hereby incorporated herein by reference.

A problem is that the multiple images need to be aligned with one another. This makes it necessary to use a tripod in most cases. Further, setting a camera to take multiple images appropriate for combination into an HDR image requires significant knowledge regarding the appropriate combination of exposures to use for each of the images.

HDR images are becoming mainstream. There is a need for methods and apparatus for easily acquiring HDR images.

SUMMARY OF THE INVENTION

This invention provides methods and apparatus for acquiring multiple exposures in electronic cameras. The methods and apparatus may be applied to acquiring images that can be combined to yield an HDR image. Apparatus according to some embodiments of the invention may comprise an electronic camera having multiple image sensors.

One aspect of the invention provides an electronic camera comprising two or more image sensor arrays. At least one of the image sensor arrays has a high dynamic range. The camera also comprises a shutter for selectively allowing light to reach the two or more image sensor arrays, readout circuitry for selectively reading out pixel data from the image sensor arrays, and, a controller configured to control the shutter and the readout circuitry. The controller comprises a processor and a memory having computer-readable code embodied therein which, when executed by the processor, causes the controller to open the shutter for an image capture period to allow the two or more image sensor arrays to capture pixel data, and, read out pixel data from the two or more image sensor arrays.

Another aspect of the invention provides a method for producing high dynamic range image data in an electronic camera comprising two or more image sensor arrays, at least one of the image sensor arrays having a high dynamic range. The method comprises allowing light to reach the two or more image sensor arrays for an image capture period, reading out pixel data captured by the two or more image sensor arrays during the image capture period, and, combining the pixel data read out from the two or more image sensor arrays to produce high dynamic range image data.

Other aspects of the invention and features of specific embodiments are described below.

BRIEF DESCRIPTION OF DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

One aspect of the invention provides an electronic camera configured to capture multiple exposures of a single image. The multiple exposures may be used to create a high dynamic range (HDR) image. Methods for combining data from multiple exposures to yield a HDR image are known in the art. For example, some such methods are described in Mann, S. et al. *Being 'undigital' with digital cameras: Extending dynamic range by combining differently exposed pictures*, In Proc. IS&T 46th Annual Conference (May, 1995) pp. 422-428 which is hereby incorporated herein by reference and in the Debevec et al. article referred to above.

Electronic cameras typically have a shutter which can be opened to selectively allow light to reach a light sensitive chip or closed to block light from reaching the chip. When the shutter is open, a lens projects an image onto the chip. The shutter may comprise a mechanical shutter, for example.

The chip measures light intensity at a number of pixel locations. Values representing the intensity at each of the pixels can be read out and stored in a memory. Light sensitive chips also typically include means for selecting the amount of time the light sensitive elements collect light before the data stored therein is read out. Such means can act as an "electronic shutter". For example, many CCD chips include a control that triggers reading out of pixel data from light-sensitive pixels into vertical data registers that are shielded from light. The inventors have determined that providing an electronic camera with multiple CCD chips allows the camera to capture multiple exposures of a single image simultaneously.

Figure 1:
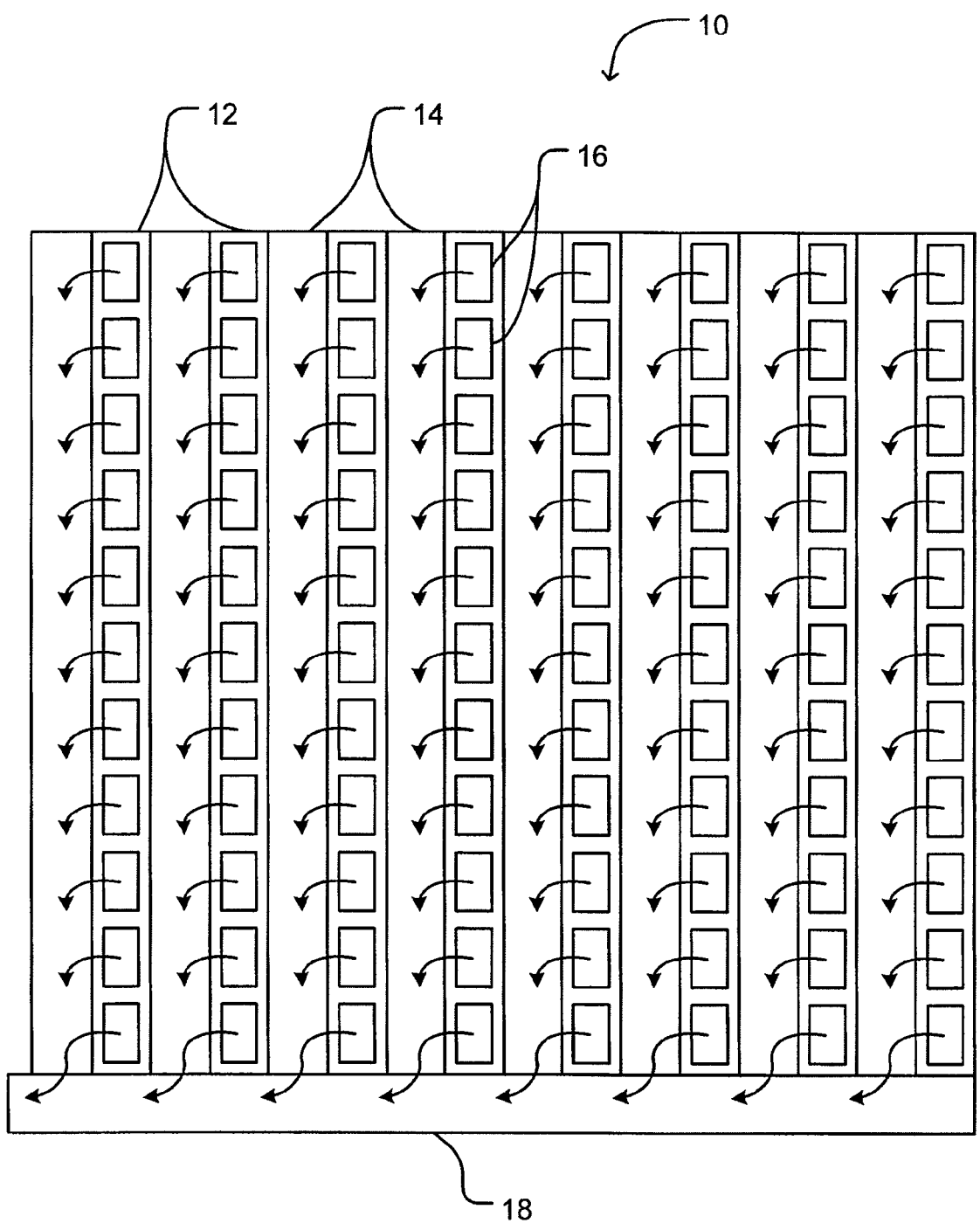
FIG. 1 shows a sensor layout for an interline transfer CCD.

FIG. 1 shows a sensor layout for an interline transfer charge coupled device ("CCD") 10 of the type used in many electronic cameras. CCD 10 comprises a plurality of imaging regions 12 which comprise light sensitive elements, and storage regions which comprise vertical registers 14. In the illustrated embodiment, imaging regions 12 alternate with vertical registers 14 in a horizontal direction. Imaging regions 12 each comprise a plurality of pixels 16. Each pixel 16 comprises a sensor that stores charge. The amount of stored charge depends upon the number of photons detected by the sensor. As indicated by the arrows in FIG. 1, after an image is exposed, pixel data characterizing the charges stored in pixels 16 are shifted to vertical registers 14.

Vertical registers 14 (which are sometimes referred to as "column registers") may be covered with an opaque mask layer (e.g. with strips of aluminum) to prevent incoming light from striking vertical registers 14. Vertical registers 14 preserve the charges' characteristics as the pixel data is shifted down vertical registers 14 into a horizontal register 18. (The terms "vertical", "horizontal" and "down" used in this description refer to the orientation of the elements shown in FIG. 1, rather than to any particular physical orientation.) The pixel data is generally read out from horizontal register 18 to an analog-to-digital converter through one or more amplifiers and/or other signal conditioning circuits (not shown).

Figure 2:
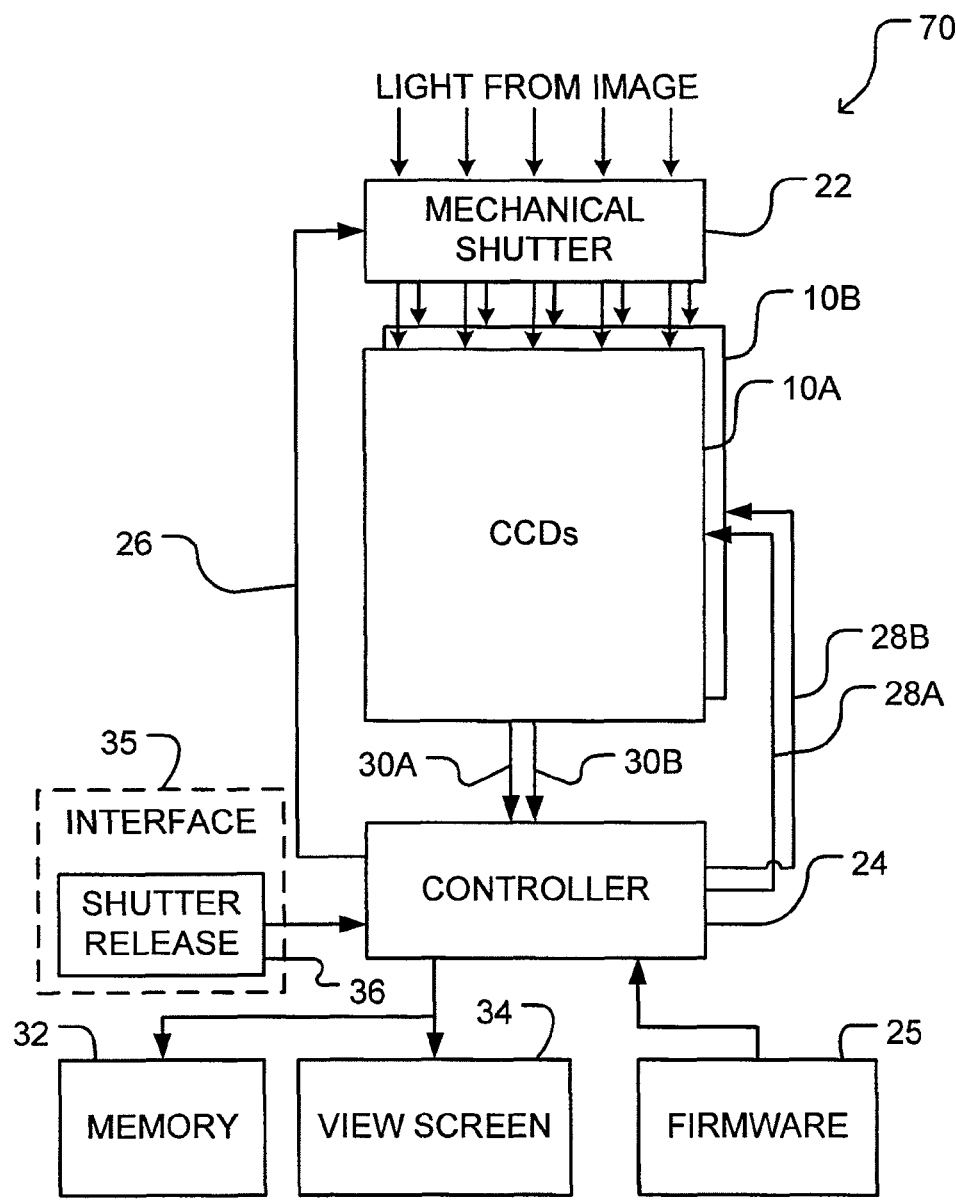
FIG. 2 is a block diagram of an electronic camera according to one embodiment of the invention; and, FIG. 3 is a flowchart illustrating the steps in a method according to another embodiment of the invention.

FIG. 2 shows an electronic camera 20 equipped with first and second CCDs 10A and 10B. Each of CCDs 10A and 10B may be similar in structure to CCD 10 of FIG. 1, but may have different characteristics. For example, first CCD 10A may comprise a high resolution sensor having a normal dynamic range. Second CCD 10B may comprise a low resolution sensor having a high dynamic range. In some embodiments, the resolution of first CCD 10A may be, for example, 1920× 1080 or higher. The resolution of second CCD 10B may be as low as, for example, ¼ the resolution of first CCD 10A in each dimension. Also, in some embodiments, first CCD 10A may comprise a color sensor, and second CCD 10B may comprise a monochrome sensor.

Camera 20 comprises a mechanical shutter 22 for selectively allowing light from an image to reach CCDs 10A and 10B. When mechanical shutter 22 is open, the incoming light is focused by an optical system (not shown) onto CCDs 10A and 10B. A controller 24 controls the opening and closing of shutter 22 by means of a shutter control line 26. Controller 24 also controls the clocking of vertical registers 14 and horizontal register 18 of CCDs 10A and 10B by means of CCD control lines 28A and 28B. Controller 24 may comprise, for example, a microprocessor running software (e.g. firmware 25). Controller 24 receives pixel data from CCDs 10A and 10B by means of data lines 30A and 30B.

Controller 24 may store the pixel data in a memory 32. Controller 24 may store the pixel data in memory 32, for example, in a data structure comprising a first portion containing HDR information, and a second portion containing tone map data, as described in International Application No. PCT/CA2004/002199 filed 24 Dec. 2004, which is hereby incorporated by reference herein.

Controller 24 may also display an image based on the pixel data on a view screen 34. View screen 34 may comprise, for example, a high luminance display to overcome ambient illumination which could make it difficult for a viewer to see the image. Alternatively, view screen 34 may comprise, for example, a high dynamic range display device such as those disclosed in International Application No. PCT/CA2002/000255 filed 27 Feb. 2002 or International Application No. PCT/CA03/00350 filed 13 Mar. 2003, both of which are hereby incorporated by reference herein. In such embodiments, camera 20 may comprise a hood to shield the high dynamic range display device from ambient illumination.

Camera 20 also comprises an interface 35 for allowing a user to interact with controller 24. Interface 35 includes a shutter release 36. Shutter release 36 may be triggered by a timer, an electronic signal, a shutter release button or the like.

Figure 3:
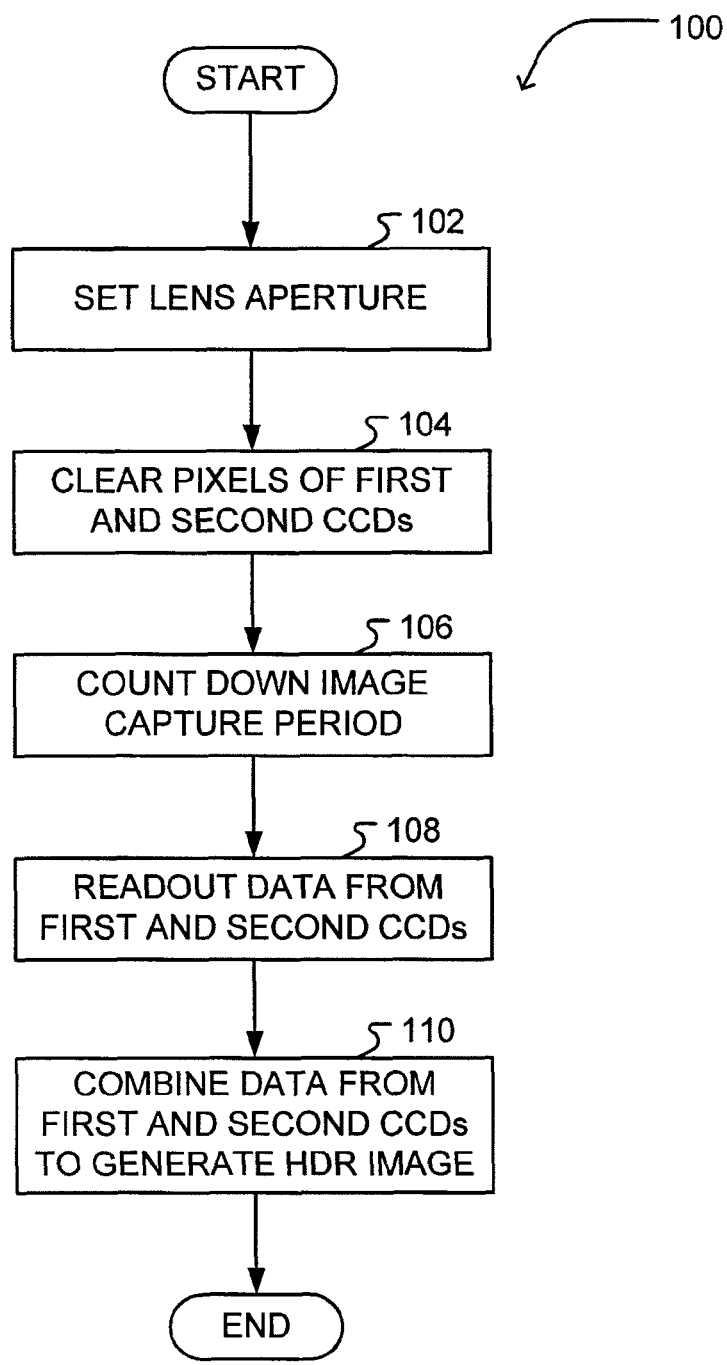

FIG. 3 shows a method 100 for producing a high dynamic range (HDR) image using a camera having a plurality of CCDs, such as for example, camera 20 of FIG. 2. Although method 100 is described in the context of a camera having two CCDs, it is to be understood that method 100 could be practiced using a camera having more than two CCDs.

In block 102, method 100 sets the camera's lens to an appropriate aperture. The aperture may be set by the camera's exposure control circuit. A wide variety of suitable systems for setting the shutter aperture in digital cameras are known in the art. Such systems may set the aperture to a user-determined value or may set the aperture according to an algorithm based upon detected light levels.

At block 104 any charge stored in the pixels of first and second CCDs 10A and 10B is cleared, and an image capture period begins. At block 106 the camera's timer counts down a predetermined time period for the image capture. First and second CCDs 10A and 10B may each be exposed for the same duration, but this is not necessary in all embodiments. Additionally or alternatively, either or both of first and second CCDs 10A and 10B may be operated to capture multiple exposures during the image capture period, for example, by employing techniques such as those described in U.S. patent applications Ser. No. 11/236,155 filed 26 Sep. 2005 and Ser. No. 11/459,633 filed 24 Jul. 2006, both of which are hereby incorporated by reference herein.

In embodiments where first and second CCDs 10A and 10B are not exposed the same period of time, time-domain interpolation techniques may be used when combining data from first and second CCDs 10A and 10B. After exposure of first and second CCDs 10A and 10B, data representative of the charge stored in the pixels of first and second CCDs 10A and 10B is read out at block 108. In embodiments where first and second CCDs 10A and 10B are each exposed only once, the data may be read out after the image capture period. In embodiments where either or both of first and second CCDs 10A and 10B capture multiple exposures, some of the data may be read out during the image capture period and some of the date may be read out after the image capture period.

At block 110, data from first and second CCDs 10A and 10B is combined to produce a HDR image. Combining data from first and second CCDs 10A and 10B may comprise, for example, the use of techniques such as those described in International Application No. PCT/CA2004/002199. The combined data from first and second CCDs 10A and 10B may be stored in a memory. For example, the combined data may be stored in a data structure comprising a first portion containing HDR information, and a second portion containing tone map data, as described in International Application No. PCT/CA2004/002199, such that both normal and dynamic range images may be produced from the combined data.

Although the inventors have determined that two CCDs are generally sufficient to produce a HDR image, cameras according to certain embodiments of the invention may comprise more than two CCDs. For example, use of more than two CCDs may provide for additional dynamic range and/or colors in the resulting image. Also, in some embodiments, at least one of the two or more CCDs may be specifically adapted for capturing HDR pixels.

A controller in a camera may be programmed to combine data from two or more CCDs to yield HDR image data and to store the HDR image data in any suitable HDR format. Where this is done, it can be appreciated that HDR images can be obtained in a way that is essentially transparent to a user.

Certain implementations of the invention comprise computer processors which execute software instructions which cause the processors to perform a method of the invention. For example, one or more processors in a controller for an electronic camera may implement the method of FIG. 3 by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An electronic camera comprising:
   two or more distinct image sensor arrays, comprising at least one low resolution image sensor array having a high dynamic range, and at least one high resolution image sensor array having a normal dynamic range smaller than the high dynamic range, such that the image sensor array having the high dynamic range is configured to capture a wider range of light intensity than the image sensor array having the normal dynamic range;
   a shutter for selectively allowing light to reach the two or more image sensor arrays;
   readout circuitry for selectively reading out pixel data from the image sensor arrays; and,
   a controller configured to control the shutter and the readout circuitry, the controller comprising a processor and a memory having computer-readable code embodied therein which, when executed by the processor, causes the controller to:
      open the shutter for an image capture period to allow the two or more image sensor arrays to capture pixel data; and,
      read out pixel data from the two or more image sensor arrays.

2. A camera according to claim 1 wherein the computer readable code, when executed by the processor, causes the controller to store the pixel data read out from the two or more image sensor arrays in a high dynamic range image data structure which specifies pixel brightness values using more than 8 bits per color.

3. A camera according to claim 2 wherein the high dynamic range data structure comprises a first portion containing high dynamic range information and a second portion containing tone map data.

4. A camera according to claim 1 wherein the computer readable code, when executed by the processor, causes the controller to combine the pixel data read out from the two or more image sensor arrays to produce high dynamic range image data.

5. A camera according to claim 4 comprising a view screen for displaying an image based on the high dynamic range image data.

6. A camera according to claim 5 wherein the view screen comprises a high dynamic range display device configured to display a high dynamic range image.

7. A camera according to claim 6 comprising a hood for shielding the high dynamic range display device.

8. A camera according to claim 1 wherein the at least one of the image sensor arrays having a high dynamic range comprises a charge coupled device specifically adapted to capture HDR pixels.

9. A camera according to claim 1, wherein the image sensor arrays are not a same image sensor array type.

10. A camera according to claim 1, wherein one of the image sensor arrays is a monochrome image sensor array and the other image sensor array is a color image sensor array.

11. A camera according to claim 1, wherein one of the image sensor arrays comprises a resolution of at least 1920×1080.

12. A camera according to claim 1, wherein one of the image sensor arrays comprises a resolution of at least 1920×1080 and the other image sensor array has a resolution of less than 1920×1080.

13. A method for producing high dynamic range image data in an electronic camera comprising two or more distinct image sensor arrays, comprising at least one low resolution image sensor array having a high dynamic range and at least one high resolution image sensor array having a normal dynamic range smaller than the high dynamic range, such that the image sensor array having the high dynamic range is configured to capture a wider range of light intensity than the image sensor array having the normal dynamic range, the method comprising:
   allowing light to reach the two or more image sensor arrays for an image capture period;
   reading out pixel data captured by the two or more image sensor arrays during the image capture period; and,
   combining the pixel data read out from the two or more image sensor arrays to produce high dynamic range image data.

14. A method according to claim 13 wherein allowing light to reach the two or more image sensor arrays for the image capture period comprises capturing multiple exposures with one of the image sensor arrays.

15. A method according to claim 14 wherein reading out pixel data captured by the two or more image sensor arrays during the image capture period comprises reading out a first exposure of the one of the image sensor arrays during the image capture period.

16. A method according to claim 13 comprising storing the high dynamic range image data in a memory accessible by the camera wherein the high dynamic range image data specifies pixel brightness values using more than 8 bits per color.

17. A method according to claim 16 wherein storing the high dynamic range image data in the memory comprises storing the high dynamic range image data in a data structure comprising a first portion containing high dynamic range information and a second portion containing tone map data.

18. A camera according to claim 1 wherein the at least one low resolution image sensor array having a high dynamic range generates pixel data using at least 16 bits per pixel.

19. A method according to claim 13 wherein the at least one low resolution image sensor array having a high dynamic range generates pixel data using at least 16 bits per pixel.

* * * * *